(12) United States Patent
Baker et al.

(10) Patent No.: US 9,277,363 B2
(45) Date of Patent: Mar. 1, 2016

(54) ADAPTIVE DATA SYNCHRONIZATION BASED ON DEVICE MOVEMENT AND LOCATION

(75) Inventors: Paul Baker, Eastleigh (GB); Alexander J. Ralph, Bradford-on-Avon (GB)

(73) Assignee: Google Technology Holdings LLC, Mountain View, CA (US)

(*) Notice: Subject to any disclaimer, the term of this patent is extended or adjusted under 35 U.S.C. 154(b) by 813 days.

(21) Appl. No.: 13/316,087

(22) Filed: Dec. 9, 2011

(65) Prior Publication Data

US 2013/0151693 A1 Jun. 13, 2013

(51) Int. Cl.
*G06F 15/173* (2006.01)
*H04W 4/02* (2009.01)
*H04L 12/26* (2006.01)
*H04L 29/08* (2006.01)
*H04W 16/18* (2009.01)
*H04W 24/08* (2009.01)

(52) U.S. Cl.
CPC ............... *H04W 4/028* (2013.01); *H04L 43/08* (2013.01); *H04L 67/18* (2013.01); *H04W 4/02* (2013.01); *H04W 16/18* (2013.01); *H04W 24/08* (2013.01)

(58) Field of Classification Search
CPC .................................................... H04L 67/322
USPC .................................................. 709/224, 225
See application file for complete search history.

(56) References Cited

U.S. PATENT DOCUMENTS

| 7,783,787 B1 | 8/2010 | DeBergalis et al. |
| 7,941,167 B2 | 5/2011 | Xu et al. |
| 7,991,879 B2 | 8/2011 | Josefsberg et al. |
| 8,040,992 B2 | 10/2011 | Demoulin et al. |
| 2004/0203918 A1 | 10/2004 | Moriguchi et al. |
| 2006/0019679 A1 | 1/2006 | Rappaport et al. |
| 2006/0056336 A1 | 3/2006 | Dacosta |
| 2006/0089152 A1* | 4/2006 | Mahonen ................... 455/456.1 |

(Continued)

FOREIGN PATENT DOCUMENTS

| EP | 1672318 A2 * | 6/2006 | ............. G01C 21/26 |
| GB | 2481254 A | 12/2011 | |
| WO | 0235766 A2 | 5/2002 | |

(Continued)

OTHER PUBLICATIONS

Drew, Stephen et al.: "Mobility-Aware Web Prefetching over Heterogeneous Wireless Networks", In Proc. of the 15th IEEE PIMRC, 2004, 15th IEEE International Symposium on Personal, Indoor and Mobile Radio Communications, Sep. 5-8, 2004, pp. 687-691.

*Primary Examiner* — Glenford Madamba
(74) *Attorney, Agent, or Firm* — Morris & Kamlay LLP (57) ABSTRACT

A method and apparatus for modifying data synchronization of a portable computing device responsive to movement of the portable computing device are disclosed. Data exchange quality associated with multiple locations is captured and stored. A predicted location of a portable computing device is determined from stored data describing previous locations of the portable computing device or navigation data. Data exchange quality associated with the predicted location is retrieved and analyzed to modify data exchange between the portable computing device and a server. For example, if the data exchange quality of the predicted location is low, a fault-tolerant data exchange method is selected or if data exchange is not possible at the predicted location, data exchanges occur more frequently prior to the portable computing device reaching the predicted location.

23 Claims, 5 Drawing Sheets

(56) References Cited

U.S. PATENT DOCUMENTS

| | | |
|---|---|---|
| 2008/0049714 A1 | 2/2008 | Commarford et al. |
| 2009/0245118 A1 | 10/2009 | McCormick |
| 2010/0054185 A1 | 3/2010 | Kaneko et al. |
| 2010/0121977 A1* | 5/2010 | Kontola et al. ............... 709/232 |
| 2011/0029670 A1* | 2/2011 | Klein et al. ............... 709/225 |

FOREIGN PATENT DOCUMENTS

| | | |
|---|---|---|
| WO | 03084136 A1 | 3/2003 |
| WO | 2006015427 A1 | 2/2006 |

* cited by examiner

ADAPTIVE DATA SYNCHRONIZATION BASED ON DEVICE MOVEMENT AND LOCATION

FIELD OF THE DISCLOSURE

The present disclosure relates generally to portable computing device data synchronization and more particularly to modifying data synchronization of a portable computing device.

BACKGROUND

Portable computing devices, such as smartphones or tablet computers, have become increasingly powerful and user-friendly. Increased network connectivity has further enhanced portable computing device functionality, allowing portable computing devices to provide a wider range of functionalities and/or data. For example, portable computing devices are commonly used to retrieve, or otherwise interact with, data stored or maintained by a server, allowing a user to more frequently view, modify or otherwise interact with data on the server.

To readily provide access to data maintained by a server, a portable computing device frequently exchanges data with the server to synchronize data stored on the portable computing device and data stored on the server. Different data synchronization settings may be used by the portable computing device to exchange data with a server. For example, the portable computing device may poll the server at a regular polling interval with a request for data that transmits data to the server and/or requests data from the server. Alternatively, data may be pushed from the portable computing device to a server, or from a server to the portable computing device, at a periodic interval or responsive to a data modification.

However, various factors affect data synchronization between the portable computing device and a server, such as the type of network used by the portable computing device and the quality of the connection between the portable computing device and a network. Thus, as the portable computing device moves to different locations, synchronization of data between the portable computing device and a server may be improved or impaired based on properties of the network at the portable computing device location or the connection between the portable computing device and the network at the portable computing device location. Accordingly, changes in portable computing device location affect exchange of data between the portable computing device location and the server, which affects user interaction with data via the portable computing device.

BRIEF DESCRIPTION OF THE DRAWINGS

The accompanying Figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the Figures are illustrated for simplicity and clarity and have not necessarily been drawn to scale. For example, the dimensions of some of the elements in the Figures may be exaggerated relative to other elements to help to improve understanding of embodiments of the present invention.

The apparatus and method components have been represented where appropriate by conventional symbols in the drawings, showing the specific details that are pertinent to understanding the embodiments of the present invention so as not to obscure the disclosure with details that will be readily apparent to those of ordinary skill in the art having the benefit of the description herein.

DETAILED DESCRIPTION

The following disclosure describes a method and apparatus for modifying data synchronization between a portable computing device and a server responsive to movement of the portable computing device. A predicted location of the portable computing device is determined, where the predicted location represents a location of the portable computing device after a time interval has elapsed. In one embodiment, the predicted location is determined from movement of the portable computing device over time. In other embodiments, the predicted location is determined from a navigation route stored on the portable computing device. A data exchange quality associated with the predicted location is retrieved and it is determined, from the retrieved data exchange quality, whether the portable computing device is capable of exchanging data with a server while the portable computing device is located at the predicted location. Responsive to determining the portable computing device is unable to exchange data with the server while the portable computing device is located at the predicted location, a frequency with which the portable computing device exchanges data with the server is increased while the portable computing device is at a location other than the predicted location.

In one embodiment, responsive to determining the portable computing device is capable of exchanging data with the server while the portable computing device is located at the predicted location, it is determined whether the data exchange quality equals or exceeds a quality threshold value. A first type of data exchange between the portable computing device and the server is selected responsive to determining the data exchange quality is less than the quality threshold value. However, responsive to the data exchange quality equaling or exceeding the quality threshold value, a second type of data exchange between the portable computing device and the server is selected.

A method and apparatus for displaying data exchange quality associated with one or more locations is also disclosed. Location data identifying a location associated with a portable computing device is received. In one embodiment, a distance associated with the location is also received. Data exchange quality associated with the received location data is retrieved. The data exchange quality describes a performance of a data exchange originating at the location identified by the location data. In one embodiment, data exchange quality for one or more locations within the received distance of the location identified by the location data is also retrieved. A visual representation of the data exchange quality associated with the location data is generated and displayed, allowing a user to identify how data is exchanged in different locations, such as in different geographic regions. The visual representation may also depict the data exchange quality associated with locations within the received distance of the location identified by the location data.

In the following description, for purposes of explanation, numerous specific details are set forth to provide a thorough understanding of the invention. However, it will be apparent to one skilled in the art that the invention can be practiced without these specific details. In other instances, structures and devices are shown in block diagram form in order to avoid obscuring the invention.

System Overview

Figure 1:
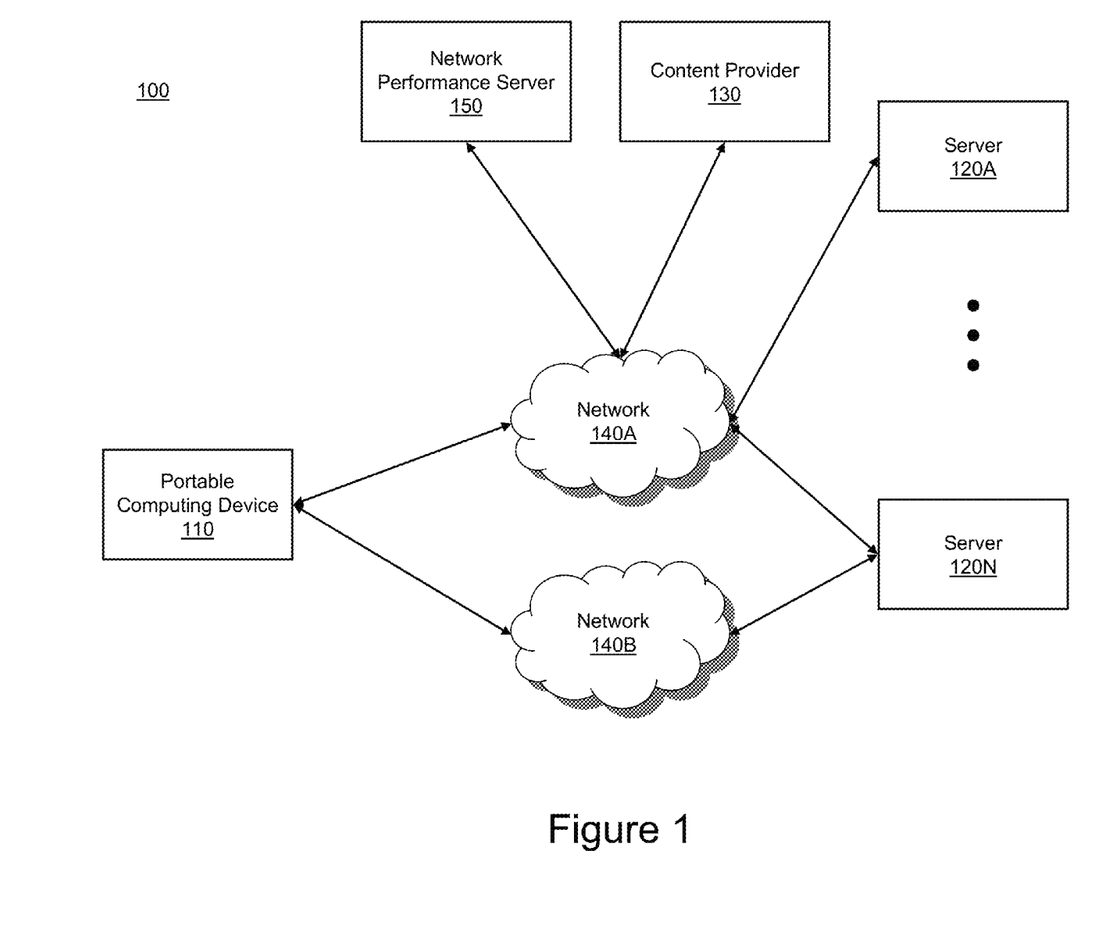
FIG. 1 is a block diagram of a computing architecture in accordance with some embodiments.

FIG. 1 is a block diagram of one embodiment of a computing architecture 100. In the embodiment shown by FIG. 1, the computing architecture 100 includes a portable computing device 110, one or more servers 120A, 120N (also referred to individually and collectively using reference number 120), a content provider 130, one or more networks 140A, 140B (also referred to individually and collectively using reference number 140). In one embodiment, the computing architecture 100 also includes a network performance server 150. However, in different embodiments, the computing architecture 100 may include different and/or additional components than those depicted by FIG. 1.

The portable computing device 110 is any device with data processing and data communication capabilities. Examples of a portable computing device 110 include a smartphone, a tablet computer, a netbook computer, a laptop computer or any other suitable device. The portable computing device 110 receives data from one or more servers 120A, 120N and/or from a content provider 130 via one or more networks 140A, 140B. In one embodiment, the portable computing device 110 executes one or more applications exchanging data with one or more servers 120 or a content provider 130. For example, the portable computing device 110 executes an electronic mail (e-mail) client application exchanging data associated with one or more e-mail accounts with one or more servers 120. As another example, the portable computing device 110 executes a social networking application receiving social network data associated with an account from a server 120 and/or transmitting social network data associated with the account to the server 120.

In one embodiment, the portable computing device 110 also receives executable data or instructions from a server 120 via one or more networks 140 that, when executed by the portable computing device 110, executes an application enabling user interaction with content. Additionally, the portable computing device 110 may receive video content, image content or other content from a content provider 130 and present the received content to a user. For example, the portable computing device 110 displays video content, or image content, from a content provider 130 on a display device. The portable computing device 110 is further described below in conjunction with FIG. 2.

Servers 120A, 120N are computing devices having data processing and data communication capabilities that exchange data with the portable computing device 110 via a network 140. For example, a server 120 provides data such as a web page, audio content, video content, e-mail, calendar information, social networking data or other content via one or more networks 140A, 140B to the portable computing device 110 and/or receives data from a portable computing device 110 via a network 140. In one embodiment, a server 120 receives a data request from the portable computing device 110 via a network 140 at a specified time interval and transmits data to the portable computing device 110 responsive to receiving the data request or stores data from the portable computing device 110 included in the received data request. In another embodiment, a server 120 pushes data to the portable computing device 110 using a network 140 at a specified interval or responsive to a modification to the data.

The content provider 130 comprises one or more computing devices transmitting video content, image content, audio content or other content to the portable computing device 110 via a network 140. For example, the content provider 130 is a video hosting web site, a television provider or another source of video, image or audio content. As another example, the content provider 130 is a streaming video source transmitting streaming video content. In one embodiment, the content provider 130 exchanges data with the portable computing device 110 via a network 140 at predetermined intervals either by pushing content to the portable computing device 110 at periodic intervals or by transmitting data to the portable computing device 110 responsive to receiving a data request from the portable computing device 110.

A network 140 is a conventional type for data, video and/or audio transmission. In various embodiments, a network 140 is a wired network, a wireless network or a combination of wireless and wired networks. In one embodiment, a network 140 is associated with a provider, which is an entity supplying and/or maintaining at least a subset of the components comprising the network 140. A network 140 may communicate a provider identifier to a portable computing device 110 coupled to the network 140 to identify the provider facilitating data exchange by the portable computing device 110.

A network 140 may comprise a local area network (LAN), a wide area network (WAN) (e.g., the Internet), and/or any other interconnected data path across which multiple devices may communicate. The network 140 may also be coupled to or include portions of a telecommunications network for sending data in a variety of different communication protocols. A network type is associated with each network 140 and identifies a protocol used by a network 140 to transmit and/or receive data. A network 140 may be implemented in a variety of configurations, such as satellite link, wireless broadcast links and/or any other suitable configuration. A network 140 may have any number of configurations, such as a star configuration, a token ring configuration or another configuration known in the art. In yet another embodiment, a network 140 may be a peer-to-peer network. In some embodiments, one or more networks 140A, 140B include Bluetooth communication networks or a cellular communications network for sending and receiving data such as via short messaging service (SMS), multimedia messaging service (MMS), hypertext transfer protocol (HTTP), direct data connection, wireless application protocol (WAP), email or other types of data known in the art.

In one embodiment, the network type identifies a protocol used to communicate voice and/or data, such as Transmission Control Protocol/Internet Protocol (TCP/IP), Global System for Mobile (GSM), Code Division Multiple Access (CDMA) system, Universal Mobile Telecommunications System (UMTS), General Packet Radio Service (GPRS), second-generation (2G), or greater, mobile network, third-generation (3G), or greater, mobile network, fourth-generation (4G), or greater, mobile network, High Speed Download Packet Access (HSDPA), High Speed Uplink Packet Access (HSUPA), Long-Term Evolution (LTE), Worldwide Interoperability for Microwave Access (WiMax) or any other suitable protocol. A storage device included in a component within a network 140 includes data identifying the network type. For example, the network 140A is associated with a 3G network type and the network 140B is associated with a LTE network type.

The portable computing device 110 may be coupled to one or more networks 140. In one embodiment, a network 140 is associated with a location. For example, the network 140A exchanges data between portable computing device 110 and a server 120 or a content provider 130 when the portable computing device 110 allocated at a first geographic location while the network 140B exchanges data between portable computing device 110 and a server 120 or a content provider 130 when the portable computing device 110 is located at a second geographic location. In one embodiment, the geographic location of the portable computing device 110 determines which network 140A, 140B a portable computing device 110 uses to exchange data with a server 120 or a content provider 130.

In one embodiment, the computing architecture 100 also includes a network performance server 150 coupled to the portable computing device 110 via one or more networks 140A, 140B. The network performance server 150 comprises one or more computing devices having data processing and data communication capabilities and storing data exchange quality associated with one or more networks 140A, 140B. Data exchange quality describes the capability of a network 140 to exchange data between a portable computing device 110 and a server 120 and/or a content provider 130. In one embodiment, the network performance server 150 associates a data exchange quality with a geographic location to describe the performance of data exchanges between a portable computing device 110 and a server 120 or a content provider 130 while the portable computing device 110 is included in a geographic location. The network performance server 150 may transmit a subset, or all, of the data exchange quality to a portable computing device 110, allowing the portable computing device 110 to locally determine the data exchange quality associated with different geographic locations. Association of data exchange quality with a location is further described below in conjunction with FIG. 3.

Figure 2:
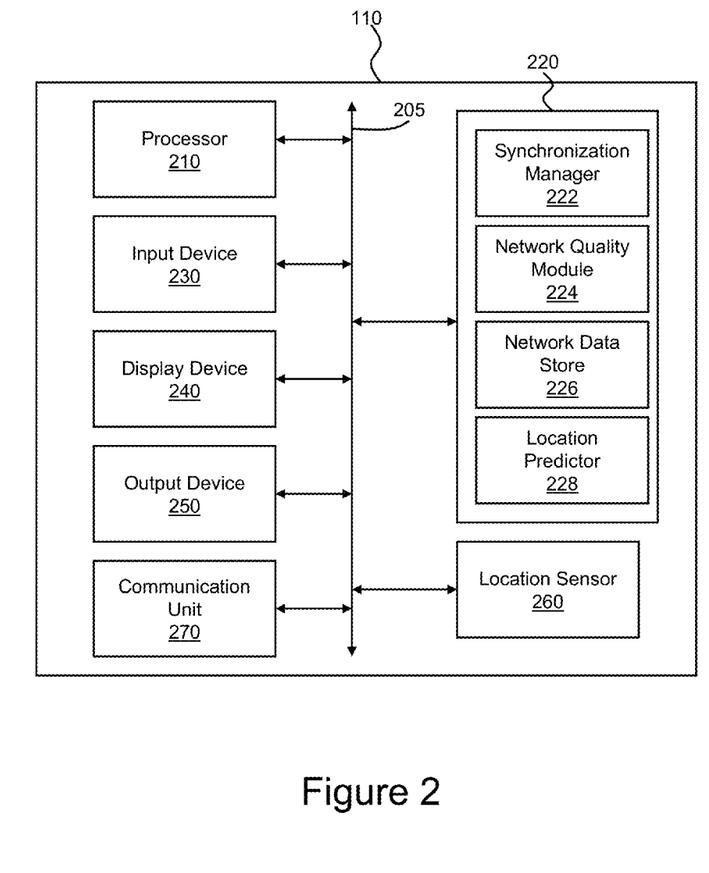
FIG. 2 is a block diagram of a portable computing device in accordance with some embodiments.

FIG. 2 is a block diagram of one embodiment of a portable computing device 110. In the embodiment shown by FIG. 2, the portable computing device 110 includes a processor 210, a storage device 220, an input device 230, a display device 240, an output device 250, a location sensor 260 and a communication unit 270 that are coupled together via a bus 205. However, in different embodiments, the portable computing device 110 may include different and/or additional components than those illustrated by FIG. 2.

The processor 210 processes data or instructions and may comprise various computing architectures. For example, the processor 210 processes data or instructions using a complex instruction set computer (CISC) architecture, a reduced instruction set computer (RISC) architecture, an architecture implementing a combination of instruction sets or any other suitable instruction set. Although FIG. 2 shows a single processor 210, in other embodiments, the portable computing device 110 may include multiple processors. The processor 210 transmits, processes and/or retrieves data from the storage device 220, the input device 230, the display device 240, the output device 250, the location sensor 260 and/or the communication unit 270.

The storage device 220 stores data and/or instructions that, when executed by the processor 210, cause the processor 210 to perform one or more actions or to provide one or more types of functionality. The data and/or instructions included in the storage device 220 may comprise computer-readable code that, when executed by the processor 210, performs one or more of the methods described herein and/or provides at least a subset of the functionality described herein. The storage device 220 may comprise a dynamic random access memory (DRAM), a static random access memory (SRAM), a hard disk, an optical storage device, a magnetic storage device, a Read Only Memory (ROM), a Programmable Read Only Memory (PROM), an Erasable Programmable Read Only Memory (EPROM), an Electrically Erasable Programmable Read Only Memory (EEPROM), a Flash memory or another memory device known in the art. The storage device 220 may be a persistent storage device, a non-persistent storage device or a combination of a persistent storage device and a non-persistent storage device, in various embodiments. The storage device 220 is coupled to the processor 210, the input device 230, the display device 240, the output device 250, the location sensor 260 and the communication unit 270 via the bus 205.

In the embodiment shown by FIG. 2, the storage device 220 includes a synchronization manager 222, a network quality module 224, a network data store 226 and a location predictor 228. In other embodiments, the storage device 220 may include different and/or additional components than those shown in FIG. 2. The synchronization manager 222 comprises instructions that, when executed by the processor 210, modify the frequency with which one or more applications executed by the portable computing device 110 exchange data with a server 120 or with a content provider 130.

In one embodiment, the synchronization manager 222 stores one or more synchronization settings describing one or more frequencies with which the portable computing device 110 exchanges data with one or more servers 120 and/or content providers 130. For example, the synchronization manager 222 includes a polling interval identifying a time between transmission of requests for data from the portable computing device 110 to a server 120 and/or to a content provider 130. As another example, the synchronization manager 222 includes instructions for establishing a push communication channel between the portable computing device 110 and a server 120 and/or a content provider 130 and may also identify when data is pushed between the server 120 or the content provider 130 using the push communication channel, such as a push interval or a description of events causing data to be pushed.

The synchronization manager 222 may include multiple synchronization settings, allowing the portable computing device 110 to exchange data with a server 120 and/or a content provider 130 using different types of data exchanges and/or different frequencies with which data is exchanged. In one embodiment, the synchronization manager 222 associates an application identifier with one or more synchronization settings, allowing different applications executed by the portable computing device 110 to use different synchronization settings or to use multiple synchronization settings. In one embodiment, a synchronization setting is associated with one or more conditions indicating when the synchronization setting is used. For example, a synchronization setting initially used by the portable computing device 110 is associated with a default synchronization setting. As another example, a user preference is associated with one or more synchronization settings, specifying the preference of a portable computing device user for use of different synchronization settings. A synchronization setting may also be associated with a data usage level, allowing different synchronization settings to be used for modifying the amount of data exchanged between the portable computing device 110 and a server 120 or a content provider 130.

The synchronization manager 222 also includes instructions that, when executed by the processor 210 modifies the synchronization setting based on data from the location predictor 228 and the network data store 226. This allows the synchronization manager 222 to modify the frequency with which the portable computing device 110 exchanges data with one or more servers 120 and/or one or more content providers 130 based on the data exchange quality of an expected location of the portable computing device 110. In one embodiment, the synchronization manager 222 retrieves a predicted location from the location predictor 228 and retrieves a data exchange quality associated with the predicted location from the network data store 226. Based on the data exchange quality associated with the predicted location, the synchronization manager 222 modifies the frequency with which the portable computing device 110 exchanges data with a server 120 and/or a content provider 130. For example, responsive to determining the predicted location is associated with a data exchange quality less than a quality threshold value, the synchronization manager 222 selects a synchronization setting using polling for data exchange and responsive to determining the predicted location is associated with a data exchange quality equaling or exceeding the quality threshold value, the synchronization manager 222 selects a second synchronization setting using a push channel for data exchange. In one embodiment, if the data exchange quality associated with the predicted location is less than network availability threshold, the synchronization manager 222 increases the frequency of data exchanges prior to the portable computing device reaching the predicted location to increased the amount of data exchanged before the portable computing device 110 reaches the predicted location and is unable to access a network 140.

In one embodiment, the synchronization manager 222 also includes a data roaming setting. The data roaming setting is enabled when the portable computing device 110 communicates with a network 140 associated with a provider differing from a provider associated with an account associated with the portable computing device 110. For example, if a first provider is associated with the account associated with the portable computing device 110, the data roaming setting is disabled when the portable computing device 110 communicates with a network 140A associated with the first provider and is enabled when the portable computing device 110 communicates with a network 140B associated with a different provider. Alternatively, the data roaming setting may be manually enabled responsive to an input.

The synchronization manager 222 may use the data roaming setting in addition to data from the location predictor 228 and the network data store 226 when modifying the frequency with which the portable computing device 110 exchanges data with a server 120 or a content provider 130. For example, if the provider associated with the network 140 associated with the predicted location differs from a provider associated with an account associated with the portable computing device 110, the synchronization manager 222 may reduce the frequency of data exchanges when the portable computing device 110 arrives at the predicted location. This allows the synchronization manager 222 to reduce the amount of data exchanged while the portable computing device 110 is coupled to a network associated with a provider differing from the provider associated with the account associated with the portable computing device 110. In one embodiment, the synchronization manager 222 reduces the data exchange frequency if the predicted location is associated with a network 140 associated with a provider differing from the provider associated with the account, even if the data exchange quality associated with the predicted location exceeds the quality threshold value. Alternatively, the data exchange quality associated with the predicted location determines whether the frequency with which data is exchanged between the portable computing device 110 and a server 120 or a content provider 130 is modified.

The network quality module 224 comprises instructions that, when executed by the processor 210, calculate a data exchange quality associated with a location of the portable computing device 110. The data exchange quality describes the capability of a network 140 coupled to the portable computing device 110 at the location to exchange data between a portable computing device 110 and a server 120 and/or a content provider 130. In one embodiment, the network quality module 224 retrieves data from a communication unit 270 describing the strength of a signal received by the communication unit 270 and a location of the portable computing device from the location sensor 260. The network quality module determines the data exchange quality associated with the location based on the strength of the wireless signal received by the communication unit 270. In some embodiments, the network quality module 224 retrieves additional data from the communication unit 270 and/or the storage device 220, such as data from a network 140 indicating a bandwidth available to the portable computing device 110, the number of data retransmissions by the communication unit 270, the amount of data lost during transmission or receipt or any other suitable data describing communication to and/or from the portable computing device 110.

In one embodiment, the data exchange quality and the location of the portable computing device 110 are transmitted, via the communication unit 270 and a network 140, to a network performance server 150. This allows the network performance server 150 to store data associating a data exchange quality with different locations. The network quality module 224 may also communicate the data exchange quality to a network data store 226, allowing the portable computing device 110 to locally store data associating the data exchange quality with one or more locations, such as geographic locations.

The network data store 226 includes data associating a data exchange quality with a location, such as a geographic location, describing the performance of one or more data exchanges occurring while a portable computing device 110 is at a geographic location. In one embodiment, the network data store 226 includes data received from the network performance server 150 via the communication unit 270 and a network 140. For example, the network data store 226 includes data from the network performance server 150 describing data exchanges from locations within a specified distance from a location determined by the location sensor 260. As the location sensor 260 modifies the location, the network data store 226 receives additional data from the network performance server 150 based on the modified location. In one embodiment, the network data store 226 associates a data exchange quality with a latitude and longitude or another location identifier. Locally associating data exchange quality with locations allows the synchronization manager 222 to more rapidly obtain data for modifying the frequency of data exchange. Associating data exchange quality with a location is further described below in conjunction with FIG. 3, and displaying data exchange quality associated with a location is further described below in conjunction with FIG. 4.

The location predictor 228 comprises instructions that, when executed by the processor 210, calculate a predicted location of the portable computing device 110 at a future time.

For example, the location predictor 228 includes data from the location sensor 260 indicating prior locations of the portable computing device 110 and a time associated the prior locations of the portable computing device 110. In one embodiment, the location predictor 228 determines a rate of movement by dividing a difference between a first location and a second location by a difference between a first time stamp associated with the first location and a second time stamp associated with the second location. Using the rate of movement, the location predictor 228 determines a predicted location by incrementing a current location from the location sensor 260 by a product of the rate of motion by a time interval. In another embodiment, the location predictor 228 determines the predicted location using navigation information. For example, if the portable computing device 110 is executing a navigation application, data from the navigation application describing a route of travel is used by the location predictor 228 to determine the predicted location.

The input device 230 is any device configured to receive input and to communicate the received input to the processor 210, to the storage device 220 or to another component of the portable computing device 110. For example, the input device 230 comprises a cursor controller, a touch-sensitive display or a keyboard. In one embodiment, the input device 230 includes an alphanumeric input device, such as a keyboard, a key pad, representations of such created on a touch-sensitive display or another device adapted to communicate information and/or commands to the processor 210 or to the storage device 220. In another embodiment, the input device 230 comprises a device for communicating positional data as well as data or commands to the processor 210 or to the storage device 220 such as a joystick, a mouse, a trackball, a stylus, a touch-sensitive display, directional keys or another suitable input device known in the art.

In one embodiment, the input device 230 may also include an orientation sensor determining an orientation associated with the portable computing device 110. For example, the orientation sensor comprises a tilt sensor measuring tilting in two or more axes of a reference plane. In one embodiment, the orientation sensor comprises an accelerometer determining an orientation of the portable computing device 110. The orientation sensor may generate a first control signal responsive to determining the portable computing device 110 has a first orientation and generates a second control signal responsive to determining the portable computing device 110 has a second orientation. For example, the orientation sensor generates the first control signal responsive to determining the portable computing device 110 has a first orientation relative to a reference plane and generates the second control signal responsive to determining the portable computing device 110 has a second orientation relative to the reference plane. For example, the orientation sensor generates the first control signal responsive to being perpendicular to a reference plane and generates the second control signal responsive to being parallel to the reference plane. In one embodiment, the first orientation and the second orientation are orthogonal to each other, such as a landscape orientation and a portrait orientation.

The display device 240 is a device that displays electronic images and/or data. For example, the display device 240 comprises an organic light emitting diode display (OLED), a liquid crystal display (LCD) or any other suitable device, such as a monitor. In one embodiment, the display device 240 includes a touch-sensitive transparent panel for receiving data or allowing other interaction with the images and/or data displayed by the display device 240.

The output device 250 comprises one or more devices that convey data or information to a user of the portable computing device 110. For example, the output device 250 includes one or more speakers or headphones for presenting audio data to a user. As another example, the output device 250 includes one or more light emitting diodes (LEDs) or other light sources to provide visual data to a user. As another example, the output device 250 includes one or more devices for providing vibrational, or haptic, feedback to a user. The above are merely examples and the output device 250 may include one or more devices for providing auditory output, tactile output, visual output, any combination of the preceding or any other suitable form of output.

The location sensor 260 comprises one or more devices determining a location associated with the portable computing device 110. For example, the location sensor 260 determines a latitude and longitude associated with the portable computing device 110. In one embodiment, the location sensor 260 is a global positioning sensor (GPS) receiver or transceiver determining the location of the portable computing device 110 based on data received by the GPS receiver or transceiver from a plurality of satellites. For example, a GPS transceiver compares the time between transmission of a signal by a satellite to the time the signal was received by the GPS transceiver to determine a distance from the GPS transceiver to the satellite; by calculating the distance from the GPS transceiver to a plurality of satellites, the location of the portable computing device is triangulated.

In an alternative embodiment, the location sensor 260 comprises instructions, that when executed by the processor 210, determines the strength of a signal received by the communication unit 270 from a plurality of locations, such as a plurality of fixed antennas, wireless access points or other locations broadcasting data. The location sensor 260 then determines the location of the portable computing device 110 by triangulating the coverage areas of three or more locations from which the communication unit 270 receives data. For example, the communication unit 270 determines the location of the portable computing device 110 as a location where the coverage area of three antennas from which the communication unit 270 receives data intersect.

The communication unit 270 transmits data from portable computing device 110 to one or more networks 140A, 140B or to other portable computing devices 110 and/or receives data from a server 120 or a content provider 130 via the one or more networks 140A, 140B. In one embodiment, the communication unit 270 comprises a wireless transceiver that transmits and/or receives data using one or more wireless communication protocols. For example, the communication unit 270 includes one or more wireless transceivers transmitting and/or receiving data using one or more wireless communication protocols, such as IEEE 802.11 a/b/g/n (WiFi), Global System for Mobile (GSM), Code Division Multiple Access (CDMA), Universal Mobile Telecommunications System (UMTS), General Packet Radio Service (GPRS), second-generation (2G), or greater, mobile network, third-generation (3G), or greater, mobile network, fourth-generation (4G), or greater, mobile network, High Speed Download Packet Access (HSDPA), High Speed Uplink Packet Access (HSUPA), Long-Term Evolution (LTE), Worldwide Interoperability for Microwave Access (WiMax), near field communication (NFC), BLUETOOTH® or another wireless communication protocol. In another embodiment, the communication unit 270 is a network adapter or other type of wired communication port for communicating with a network 140 or with another portable computing device 110 using a wired communication protocol, such as Universal Serial Bus (USB), Ethernet or another suitable wired communication protocol. In yet another embodiment, the communication unit 270 comprises a combination of one or more transceivers and a wired network adapter, or similar wired device.

Methods

Figure 3:
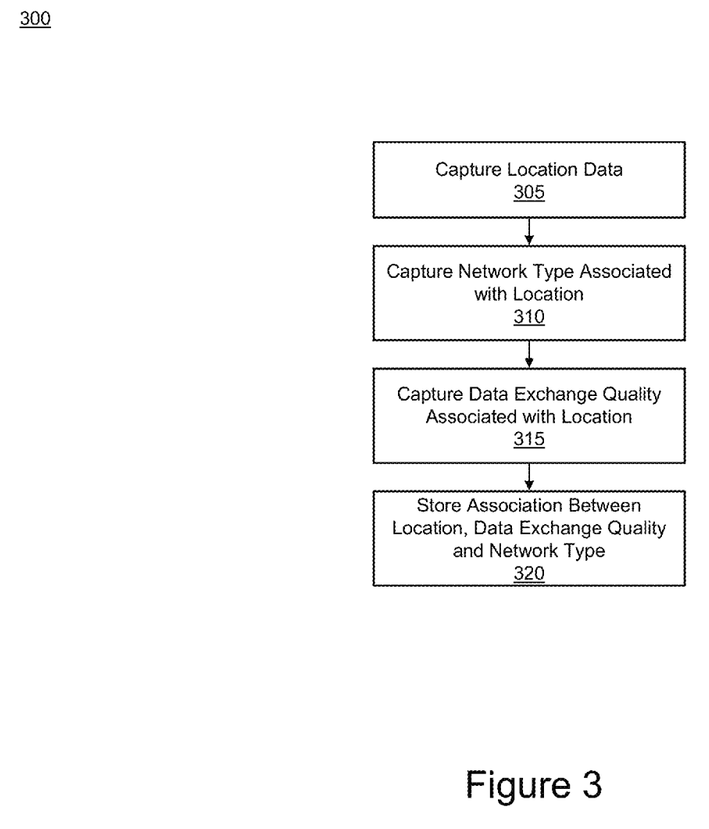
FIG. 3 is a flow chart of a method for associating data exchange quality with one or more locations in accordance with some embodiments.

FIG. 3 is a flow chart of a method 300 for associating data exchange quality with one or more locations in accordance with some embodiments. In one embodiment, the steps illustrated by the method 300 shown by FIG. 3 are implemented by instructions for performing the described actions embodied, or stored, within a non-transitory computer readable storage medium that, when executed by a processor 210, provide the functionality further described below. Examples of a non-transitory computer readable storage medium, such as the storage device 220, include flash memory, random access memory (RAM) or any other suitable medium known to one skilled in the art.

The method 300 may be implemented in embodiments of hardware, software or combinations of hardware and software. In one embodiment, instructions for performing the actions described below are stored in the storage device 220 of the portable computing device 110, such as in the network quality module 224, and execution of the instructions by the processor 210 performs the actions described below. Alternatively, the network performance server 150 executes instructions for performing the actions described below. Moreover, in some embodiments, the method 300 includes different and/or additional steps than those shown by FIG. 3.

The network quality module 224 or the network performance server 150 captures 305 location data associated with a portable computing device 110. In one embodiment, a location sensor 260 in the portable computing device 110 determines a location associated with the portable computing device 110 and the network quality module 224 captures 305 the location from the location sensor 260. Alternatively, the location determined by the location sensor 260 is transmitted to the network performance server 150 via the communication unit 270 and a network 140. For example, the location sensor 260 triangulates signals received from satellites, wireless access points and/or broadcast antennas to determine a location associated with the portable computing device 110 and the network quality module 224 or the network performance server 150 captures 305 the location from the location sensor 260.

Data is captured 310 from the communication unit 270 or from the storage device 220 associating a network type with the network 140 with which the communication unit 270 exchanges data. In one embodiment, the captured network type data indicates a protocol used by the network 140 coupled to the portable computing device 110. For example, the network type data identifies a protocol such as Transmission Control Protocol/Internet Protocol (TCP/IP), Global System for Mobile (GSM), Code Division Multiple Access (CDMA) system, Universal Mobile Telecommunications System (UMTS), General Packet Radio Service (GPRS), second-generation (2G), or greater, mobile network, third-generation (3G), or greater, mobile network, fourth-generation (4G), or greater, mobile network, High Speed Download Packet Access (HSDPA), High Speed Uplink Packet Access (HSUPA), Long-Term Evolution (LTE) or Worldwide Interoperability for Microwave Access (WiMax). The network quality module 224, or the network performance server 150, associates the network type with the location data to pair the network type with a location.

In addition to capturing 310 network type data, the network quality module 224 or the network performance server 150 captures 315 a data exchange quality associated with the portable computing device 110. In one embodiment, the data exchange quality is derived from a strength of a wireless signal received by the communication unit 270 in the portable computing device 110. In some embodiments, the data exchange quality is calculated using additional data, such as data from the network 140 indicating a bandwidth available to the portable computing device 110, the number of data retransmissions by the communication unit 270, the amount of data lost during transmission or receipt or any other suitable data describing communication to and/or from the portable computing device 110.

The network performance server 150 or the network quality module 224 then stores 320 an association between the location data, the network type and the data exchange quality. This association allows subsequent identification of the signal quality and network type associated with a location. In one embodiment, the network quality module 224 stores 320 the association between the location data, the network type and the data exchange quality are stored 320 in a network data store 226 included in the portable computing device 110. Alternatively, the network quality module 224 transmits the association between the location data, the network type and the data exchange quality to the network performance server 150, where it is stored 320. In one embodiment, a table or database includes different fields, with the location data, the network type and the data exchange quality stored in different fields, simplifying retrieval of the network type and data exchange quality using location data. For example, an entry in the table or database including the location data, the network type and the data exchange quality is retrieved using the location data.

Hence, the method 300 allows the network performance server 150 and/or the network data store 226 to accumulate and store data exchange quality and/or a network type associated with one or more locations. This stored data allows subsequent identification and/or analysis of the data exchange quality at different locations. Storing 320 an association between data exchange quality and location data allows subsequent retrieval of the data exchange quality for the location to modify data exchange settings based the data exchange quality associated with the location prior to a portable computing device 110 reaching the location.

Figure 4:
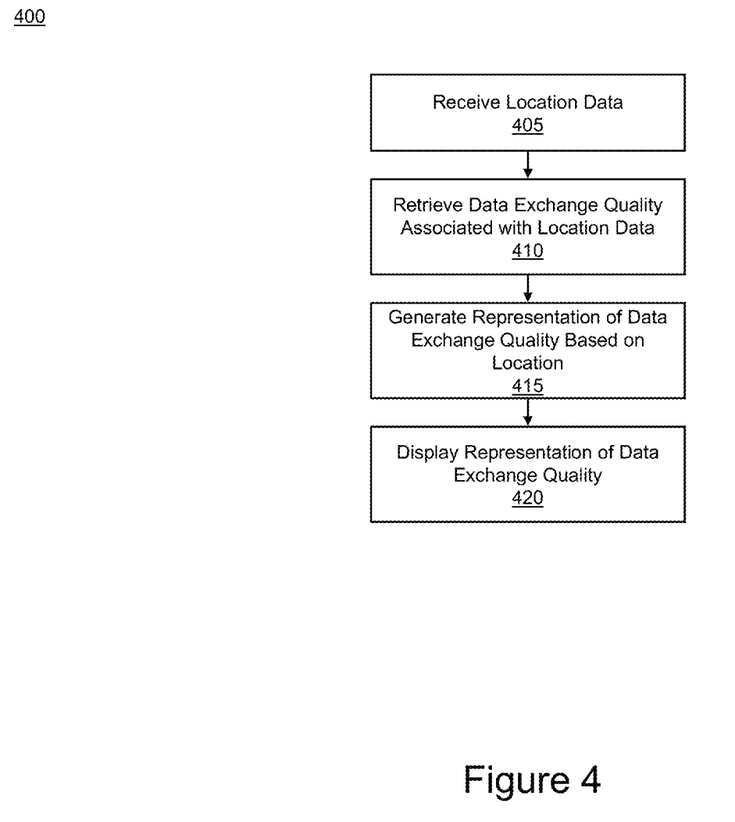
FIG. 4 is a flow chart of a method for displaying data exchange quality associated with one or more locations in accordance with some embodiments.

FIG. 4 is a flow chart of a method 400 for displaying data exchange quality associated with one or more locations in accordance with some embodiments. In one embodiment, the steps illustrated by the method 400 shown by FIG. 4 are implemented by instructions for performing the described actions embodied, or stored, within a non-transitory computer readable storage medium that, when executed by a processor 210, provide the functionality further described below. Examples of a non-transitory computer readable storage medium, such as the storage device 220, include flash memory, random access memory (RAM) or any other suitable medium known to one skilled in the art.

The method 400 may be implemented in embodiments of hardware, software or combinations of hardware and software. In one embodiment, instructions for performing the actions described below are stored in the storage device 220 of the portable computing device 110, such as in the network quality module 224 or the synchronization manager 222, and execution of the instructions by the processor 210 performs the actions described below. Alternatively, the network performance server 150 executes instructions for performing the actions described below. Moreover, in some embodiments, the method 400 includes different and/or additional steps than those shown by FIG. 4.

In various embodiments, the network quality module 224, the synchronization manager 222 or the network performance server 150 receives 405 location data associated with a portable computing device 110. In one embodiment, the location data is received 405 from a location sensor 260 responsive to an input device 230 in the portable computing device 110 receiving an input. For example, a portable computing device user requests data exchange quality data for a location proximate to a location associated with the portable computing device 110. In one embodiment, the received location data may also include distance, such as a radius, from the location.

A data exchange quality associated with the received location data is retrieved 410 from a network data store 226 in the portable computing device 110 or from the network performance server 150. For example, data exchange quality is identified within the network data store 226, or within the network performance server 150, using the location data. This allows retrieval 410 of stored data exchange quality associated with the location data. In an embodiment where a distance is received 405 with the location data, a distance between the received location data and stored location data less than or equal to the received distance from the received location data is also retrieved 410. For example, data exchange quality associated with stored locations within a specified radius of the received location data is retrieved 410.

From the retrieved data exchange quality, the network quality module 224, the synchronization manager 222 or the network performance server 150 generates 415 a visual representation of the data exchange quality associated with the received location and/or associated with additional locations within a distance from the received location. In one embodiment, the visual representation of the data exchange quality is a map of a geographic region proximate to the received location displaying an indication of the data exchange quality associated with different locations. For example, regions of a map proximate to the received location are color-coded based on the data exchange quality of a location corresponding to the regions. Alternatively, a numeric representation of the data exchange quality associated with a location is displayed on a map in a display region corresponding to the location. Alternatively, the visual representation of the data exchange quality displays zones corresponding to locations and displays an indication of the data exchange quality associated with a location within a zone. In one embodiment, the visual representation is generated 415 by associating a display region with a location and the location's associated data exchange quality.

In one embodiment, the visual representation of data exchange quality identifies a service or application best suited for exchanging data in a location based on the data exchange quality associated with the location. For example, the data exchange quality associated with a location is compared to stored data associated with an application or service. An indication of the application or service associated with a data exchange quality closest in value to the data exchange quality associated with the location is displayed proximate to a display region associated with the location.

The visual representation of the data exchange quality is communicated to a display device 240 included in the portable computing device 110, where the visual representation of the data exchange quality is displayed 420. In one embodiment, the visual representation of the data exchange quality is communicated, via a network 140, from the network performance server 150 to the portable computing device 110 for display 420. Alternatively, the visual representation of the data exchange quality is retrieved from the synchronization manager 222 or from the network quality module 224 and displayed 420 using the display device 240.

Hence, the method 400 allows a portable computing device user to identify the data exchange quality associated with multiple locations. This provides the portable computing device user to identify locations where data exchange quality may be poor and plan accordingly by selecting an alternate route or accounting for reduced portable computing device functionality in certain locations. For example, the method 400 would allow a user to modify travel plans to avoid locations where a download or video communication session is likely to perform poorly or to be terminated.

Figure 5:
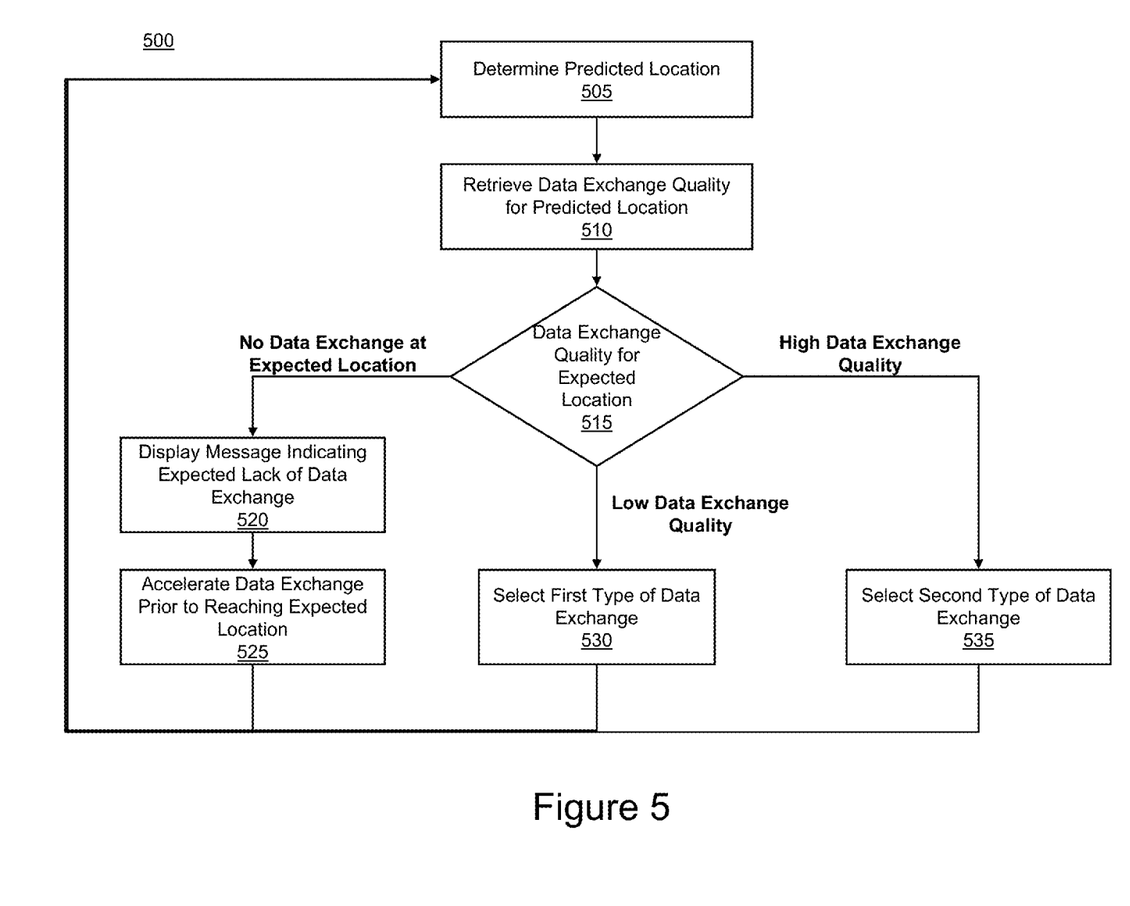
FIG. 5 is a flow chart of a method for modifying data synchronization of a portable computing device responsive to movement of the portable computing device in accordance with some embodiments.

FIG. 5 is a flow chart of a method 500 for modifying data synchronization of a portable computing device 110 responsive to movement of the portable computing device 110 in accordance with some embodiments. In one embodiment, the steps illustrated by the method 500 shown by FIG. 5 are implemented by instructions for performing the described actions embodied, or stored, within a non-transitory computer readable storage medium that, when executed by a processor 210, provide the functionality further described below. Examples of a non-transitory computer readable storage medium, such as the storage device 220, include flash memory, random access memory (RAM) or any other suitable medium known to one skilled in the art.

The method 500 may be implemented in embodiments of hardware, software or combinations of hardware and software. In one embodiment, instructions for performing the actions described below are stored in the storage device 220 of the portable computing device 110, such as in the synchronization manager 222 and/or the location predictor 228, and execution of the instructions by the processor 210 performs the actions described below. Moreover, in some embodiments, the method 500 includes different and/or additional steps than those shown by FIG. 5.

The location predictor 228 in a portable computing device determines 505 a predicted location of a portable computing device 110 at a time interval from the current time. In one embodiment, the location predictor 228 determines a rate of movement by dividing a difference between a first location and a second location by a difference between a first time stamp associated with the first location and a second time stamp associated with the second location. Using the rate of movement, the location predictor 228 determines 505 the predicted location by incrementing a current location from the location sensor 260 by the product of the rate of motion and a time interval. In another embodiment, the location predictor 228 determines 505 the predicted location using navigation information. For example, if the portable computing device 110 is executing a navigation application, data from the navigation application describing a location along a route of travel determines 505 the predicted location at a subsequent time.

The synchronization manager 222 receives the predicted location from the location predictor 228 and retrieves 510 a data exchange quality associated with the predicted location from a network data store 226 or from a network performance server 150. In one embodiment, the predicted location is used to identify an entry in a database or table and a field in the identified entry corresponding to a data exchange quality is retrieved 510. The synchronization manager 222 may also retrieve 510 data exchange qualities for alternative locations, such as locations within a predetermined distance of the predicted location.

The synchronization manager 222 determines 515 a level of the data exchange quality. In one embodiment, the synchronization manager 222 determines whether 515 the data exchange quality has one of a plurality of levels—a level indicating a network 140 is not available, a level indicating poor data exchange quality and a level indicating high data exchange quality. For example, the synchronization manager 222 compares the data exchange quality to a plurality of threshold values to determine 515 the level.

In one embodiment, the synchronization manager 222 compares the data exchange quality to a network availability threshold value to determine 515 whether data is capable of being exchanged while the portable computing device 110 is located at the predicted location. For example, the network availability threshold value is a minimum data exchange quality for enabling data exchange between the portable computing device 110 and a server 120 or a content provider 130. In one embodiment, the network availability threshold value indicates whether a network 140 is accessible while the portable computing device 110 is located at the predicted location.

Responsive to determining 515 the data exchange quality is less than the network availability threshold value, the synchronization manager 222 determines 515 that network data exchange is not expected to be possible while at the predicted location. For example, determining 515 the data exchange quality is less than the available threshold value indicates that a network 140 cannot be accessed while the portable computing device 110 is located at the predicted location. In one embodiment, responsive to determining 515 the data exchange quality is less than the network availability threshold value, a message indicating the inability to exchange data while at the predicted location is generated by the synchronization manager 222 and displayed 520 by a display device 240 of the portable computing device 110.

In response to determining 515 the data exchange quality is less than the network availability threshold value, the synchronization manager 222 accelerates 525 data exchange between the portable computing device 110 and a server 120 or a content provider 130. This increases the amount of data exchanged between the portable computing device 110 and a server 120 or a content provider 130 before the portable computing device 110 reaches the predicted location and is unable to exchange data. In one embodiment, the synchronization manager 222 accelerates 525 data exchange by selecting a synchronization setting establishing a push communication channel between the portable computing device 110 and the server 120 or the content provider 130. Alternatively, the synchronization manager 222 accelerates 525 data exchange by selecting a synchronization setting increasing the frequency with which the portable computing device 110 transmits requests for data to the server 120 or to the content provider 130 while the portable computing device 110 is at a location other than the predicted location.

Responsive to determining 515 the data exchange quality equals or exceeds the network availability threshold value, the synchronization manager 222 compares the data exchange quality to a quality threshold value. Responsive to determining 515 the data exchange quality is less than the quality threshold value, the synchronization manager 222 determines 515 that the data exchange quality associated with the predicted location is low and selects 530 a first type of data exchange. In one embodiment, the synchronization manager 222 selects 530 a synchronization setting associated with a fault-tolerant synchronization type, such as polling. Alternatively, the synchronization manager 222 selects 530 a synchronization setting associated with a synchronization type that less frequently exchanges data to reduce the amount of data exchanged when the portable computing device 110 reaches the predicted location. For example, the synchronization manager 222 selects 530 a synchronization setting where long time intervals separate requests for data transmitted by the portable computing device 110 to a server 120 or to a content provider 130.

Responsive to determining 515 the data exchange quality equals or exceeds the quality threshold value, the synchronization manager 222 determines 515 that the data exchange quality associated with the predicted location is high and selects 535 a second type of data exchange. In one embodiment, the synchronization manager 222 selects 535 a synchronization setting associated with a synchronization type optimizing the amount of data exchanged between the portable computing device 110 and a server 120 or a content provider 130. For example, the synchronization manager 222 selects 535 a synchronization setting establishing a push communication channel between the portable computing device 110 and a server 120 or a content provider 130. As another example, the synchronization setting where a short time interval separates requests for data transmitted by the portable computing device 110 to a server 120 or to a content provider 130, increasing the amount of data exchanged.

As the location of the portable computing device 110 changes, the location predictor 228 determines 505 a second predicted location using additional data from the location sensor 260. The synchronization manager retrieves 510 data exchange quality data associated with the second predicted location and determines 515 whether data is capable of being exchanged while the portable computing device 110 is located at the second predicted location, as described above. Thus, the method 500 allows dynamic modification of data exchange by the portable computing device 110 as the predicted location of the portable computing device 110 changes. This enables modification of the type of data exchange used by the portable computing device 110 based on the direction of movement of the portable computing device 110 to more efficiently exchange between the portable computing device 110 and a server 120 or a content provider 130.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "ha . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. In some embodiments, a combination of the two approaches may be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions, programs and/or integrated circuits with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   retrieving a first location and a first time stamp associated with the first location;
   retrieving a second location and a second time stamp associated with the second location;
   determining a predicted location for a portable computing device by incrementing a current location by a product of a rate of movement and a time interval, the predicted location indicating a location at the time interval from a current time, the rate of movement determined from the first location, the first time stamp, the second location, and the second time stamp;
   retrieving a data exchange quality associated with the predicted location;
   determining, using the data exchange quality associated with the predicted location, whether the portable computing device is capable of exchanging data with a server while the portable computing device is located at the predicted location; and
   responsive to determining the portable computing device is not capable of exchanging data with the server while the portable computing device is located at the predicted location, increasing a frequency with which the portable computing device exchanges data with the server while the portable computing device is at a location prior to entering the predicted location.

2. The method of claim 1, further comprising:
   responsive to determining the portable computing device is capable of exchanging data with the server while the portable computing device is located at the predicted location, determining whether the data exchange quality equals or exceeds a quality threshold value;
   responsive to determining the data exchange quality does not equal or exceed the quality threshold value, selecting a first type of data exchange between the portable computing device and the server; and
   responsive to determining the data exchange quality does equal or exceed the quality threshold value, selecting a second type of data exchange between the portable computing device and the server.

3. The method of claim 2, wherein selecting the first type of data exchange between the portable computing device and the server comprises:
   selecting a polling-based data exchange where the portable computing device receives data from the server responsive to the server receiving a request for data from the portable computing device.

4. The method of claim 2, wherein selecting the second type of data exchange between the portable computing device and the server comprises:
   selecting a push-based data exchange between the portable computing device and the server.

5. The method of claim 1, wherein determining the predicted location for the portable computing device comprises:
   calculating the rate of movement by dividing a difference between the first location and the second location by a second difference between the first time stamp and the second time stamp.

6. The method of claim 1, wherein determining the predicted location for a portable computing device comprises:
   retrieving navigation information from a storage device; and
   identifying a location included in a route specified by the navigation information.

7. The method of claim 1, wherein determining, using the data exchange quality associated with the predicted location, whether the portable computing device is capable of exchanging data with the server while the portable computing device is located at the predicted location comprises:
   determining whether the data exchange quality associated with the predicted location is less than a network availability threshold; and
   responsive to determining the data exchange quality associated with the predicted location is less than the network availability threshold, determining the portable computing device is not capable of exchanging data with the server from the predicted location.

8. The method of claim 1, further comprising:
responsive to determining the portable computing device is not capable of exchanging data with the server while the portable computing device is located at the predicted location, displaying a message indicating the portable computing device is not capable of exchanging data with the server from the predicted location.

9. An apparatus comprising:
a processor;
a location sensor determining a location of the apparatus;
a non-transitory computer readable storage device coupled to the processor, the non-transitory computer readable storage device including instructions that, when executed by the processor, cause the processor to:
retrieve a first location and a first time stamp associated with the first location;
retrieve a second location and a second time stamp associated with the second location;
determine a predicted location for the apparatus device by incrementing a current location by a product of a rate of movement and a time interval, the predicted location indicating a location at the time interval from a current time, the rate of movement determined from the first location, the first time stamp, the second location, and the second time stamp;
retrieve a data exchange quality associated with the predicted location;
determine, using the data exchange quality associated with the predicted location, whether the apparatus is capable of exchanging data with a server while the portable computing device is located at the predicted location; and
responsive to determining the apparatus is not capable of exchanging data with the server while the portable computing device is located at the predicted location, increase a frequency with which the apparatus exchanges data with the server while the apparatus is at a location prior to entering the predicted location.

10. The apparatus of claim 9, wherein the non-transitory computer readable storage device further includes instructions that, when executed by the processor, cause the processor to:
responsive to determining the apparatus is capable of exchanging data with the server while the portable computing device is located at the predicted location, determine whether the data exchange quality equals or exceeds a quality threshold value;
responsive to determining the data exchange quality does not equal or exceed the quality threshold value, select a first type of data exchange between the apparatus and the server; and
responsive to determining the data exchange quality does equal or exceed the quality threshold value, select a second type of data exchange between the apparatus and the server.

11. The apparatus of claim 9, wherein determine the predicted location for the apparatus comprises:
calculate the rate of movement by dividing a difference between the first location and the second location by a second difference between the first time stamp and the second time stamp.

12. The apparatus of claim 9, wherein determine the predicted location for the apparatus comprises:
retrieve navigation information from the non-transitory computer readable storage device; and
identify a location included in a route specified by the navigation information.

13. The apparatus of claim 9, wherein determine, using the data exchange quality associated with the predicted location, whether the apparatus is capable of exchanging data with the server while the portable computing device is located at the predicted location comprises:
determine whether the data exchange quality associated with the predicted location is less than a network availability threshold; and
responsive to determining the data exchange quality associated with the predicted location is less than the network availability threshold, determine the apparatus is not capable of exchanging data with the server from the predicted location.

14. The apparatus of claim 9, wherein the non-transitory computer readable storage device further includes instructions that, when executed by the processor, cause the processor to:
responsive to determining the apparatus is not capable of exchanging data with the server while the portable computing device is located at the predicted location, display a message on a display device coupled to the processor, the message indicating the apparatus is not capable of exchanging data with the server from the predicted location.

15. A device, comprising:
a location sensor that determines a location of the device;
a non-transitory computer readable storage medium configured to store the location of the device;
a processor communicatively coupled to the storage medium, the processor configured to:
retrieve a first location and a first time stamp associated with the first location;
retrieve a second location and a second time stamp associated with the second location;
determine a predicted location for the device by incrementing a current location by a product of a rate of movement and a time interval, the predicted location indicating a location at the time interval from a current time; time, the rate of movement determined from the first location, the first time stamp, the second location, and the second time stamp;
retrieve a data exchange quality associated with the predicted location;
determine, using the data exchange quality associated with the predicted location, whether the device is capable of exchanging data with a server while the device is located at the predicted location; and
responsive to determining the device is not capable of exchanging data with the server while the device is located at the predicted location, increase a frequency with which the device exchanges data with the server while the device is at a location prior to entering the predicted location.

16. The device of claim 15, wherein the processor is further configured to:
responsive to determining the device is capable of exchanging data with the server while the device is located at the predicted location, determine whether the data exchange quality is at least equal to a quality threshold value;
responsive to determining the data exchange quality is not at least equal to the quality threshold value, select a first type of data exchange between the device and the server; and responsive to determining the data exchange quality is at least equal to the quality threshold value, select a second type of data exchange between the device and the server.

17. The device of claim 15, the processor is configured to determine the predicted location by:
    calculating the rate of movement by dividing a difference between the first location and the second location by a second difference between the first time stamp and the second time stamp.

18. The device of claim 15, the processor is configured to determine the predicted location by:
    retrieving navigation information from the non-transitory computer readable storage device; and
    identifying a location included in a route specified by the navigation information.

19. The device of claim 15, the processor is configured to determine, using the data exchange quality associated with the predicted location, whether the device is capable of exchanging data with the server while the portable computing device is located at the predicted location by:
    determining whether the data exchange quality associated with the predicted location is less than a network availability threshold; and
    responsive to determining the data exchange quality associated with the predicted location is less than the network availability threshold, determining the device is not capable of exchanging data with the server from the predicted location.

20. The device of claim 15, the processor further configured to:
    responsive to determining the device is not capable of exchanging data with the server while the device is located at the predicted location, display a message on a display device coupled to the processor, the message indicating the device is not capable of exchanging data with the server from the predicted location.

21. A method comprising:
    determining a predicted location for a portable computing device, the predicted location indicating a location at a time interval from a current time;
    retrieving a data exchange quality associated with the predicted location;
    determining, using the data exchange quality associated with the predicted location, whether the portable computing device is capable of exchanging data with a server while the portable computing device is located at the predicted location;
    responsive to determining the portable computing device is not capable of exchanging data with the server while the portable computing device is located at the predicted location, increasing a frequency with which the portable computing device exchanges data with the server while the portable computing device is at a location prior to entering the predicted location;
    responsive to determining the portable computing device is capable of exchanging data with the server while the portable computing device is located at the predicted location, determining whether the data exchange quality equals or exceeds a quality threshold value; and
    responsive to determining the data exchange quality does not equal or exceed the quality threshold value, selecting a polling-based data exchange where the portable computing device receives data from the server responsive to the server receiving a request for data from the portable computing device while the portable computing device is at a location other than the predicted location.

22. An apparatus comprising:
    a processor;
    a location sensor determining a location of the apparatus;
    a non-transitory computer readable storage device coupled to the processor, the non-transitory computer readable storage device including instructions that, when executed by the processor, cause the processor to:
    determine a predicted location for a portable computing device, the predicted location indicating a location at a time interval from a current time;
    retrieve a data exchange quality associated with the predicted location;
    determine, using the data exchange quality associated with the predicted location, whether the portable computing device is capable of exchanging data with a server while the portable computing device is located at the predicted location;
    responsive to determining the portable computing device is not capable of exchanging data with the server while the portable computing device is located at the predicted location, increase a frequency with which the portable computing device exchanges data with the server while the portable computing device is at a location prior to entering the predicted location;
    responsive to determining the portable computing device is capable of exchanging data with the server while the portable computing device is located at the predicted location, determine whether the data exchange quality equals or exceeds a quality threshold value; and
    responsive to determining the data exchange quality does not equal or exceed the quality threshold value, select a polling-based data exchange where the portable computing device receives data from the server responsive to the server receiving a request for data from the portable computing device while the portable computing device is at a location other than the predicted location.

23. A device, comprising:
    a location sensor that determines a location of the device;
    a non-transitory computer readable storage medium configured to store the location of the device;
    a processor communicatively coupled to the storage medium, the processor configured to:
    determine a predicted location for a portable computing device, the predicted location indicating a location at a time interval from a current time;
    retrieve a data exchange quality associated with the predicted location;
    determine, using the data exchange quality associated with the predicted location, whether the portable computing device is capable of exchanging data with a server while the portable computing device is located at the predicted location;
    responsive to determining the portable computing device is not capable of exchanging data with the server while the portable computing device is located at the predicted location, increase a frequency with which the portable computing device exchanges data with the server while the portable computing device is at a location prior to entering the predicted location;
    responsive to determining the portable computing device is capable of exchanging data with the server while the portable computing device is located at the predicted location, determine whether the data exchange quality equals or exceeds a quality threshold value; and responsive to determining the data exchange quality does not equal or exceed the quality threshold value, select a polling-based data exchange where the portable computing device receives data from the server responsive to the server receiving a request for data from the portable computing device while the portable computing device is at a location other than the predicted location.

\* \* \* \* \*